United States Patent [19]

Dix et al.

[11] Patent Number: 4,971,342
[45] Date of Patent: Nov. 20, 1990

[54] ANIMAL FIGURE VELOCIPEDE

[76] Inventors: Albert Dix; Robert Dix, both of 11359 NE. Halsey, #10, Portland, Oreg. 97220

[21] Appl. No.: 434,352

[22] Filed: Nov. 13, 1989

[51] Int. Cl.⁵ .............................................. A63G 19/00
[52] U.S. Cl. .................. 280/1.13; 280/1.208; 403/328
[58] Field of Search .................. 280/1.13, 1.16, 1.201, 280/1.202, 1.204, 1.208, 1.21, 1.22, 1.23, 1.188, 1.195, 1.196; 403/328; 446/485

[56] References Cited

U.S. PATENT DOCUMENTS

| | | | |
|---|---|---|---|
| 1,499,884 | 7/1924 | Singer | 280/1.202 |
| 2,006,349 | 7/1935 | Fowler | 280/1.202 |
| 4,712,830 | 12/1987 | Charbrol et al. | 403/328 |

Primary Examiner—Charles A. Marmor
Assistant Examiner—Victor E. Johnson
Attorney, Agent, or Firm—Kimble, MacMichael & Upton

[57] ABSTRACT

An equine animal figure velocipede in the form of a tricycle, having a head member and front legs member fixably attached to a rod means so that the head and legs members rotate in parallelism about the front portion of the main body of the velocipede. A pair of transparent eyes with decorative decals are located on opposite sides of the head member, and an illuminating mechanism is provided inside the head which may be activated by switches on the rein bars on either side of the head.

4 Claims, 4 Drawing Sheets

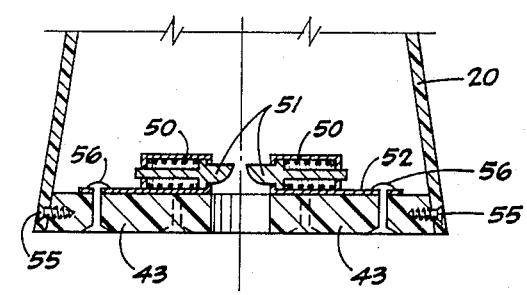
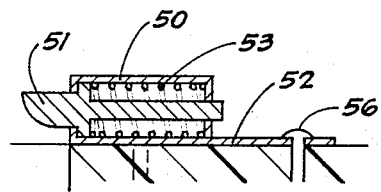
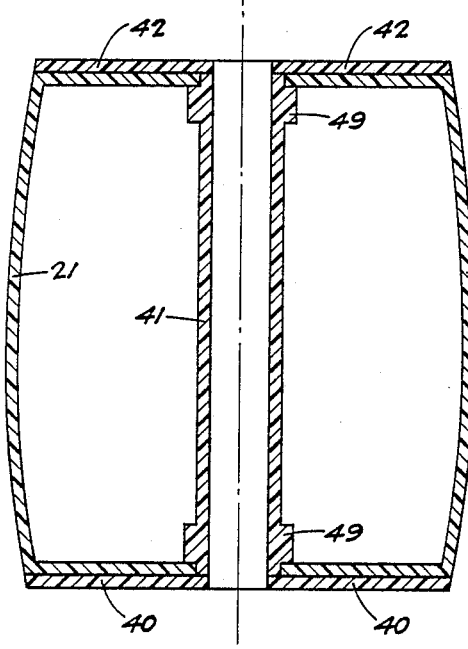
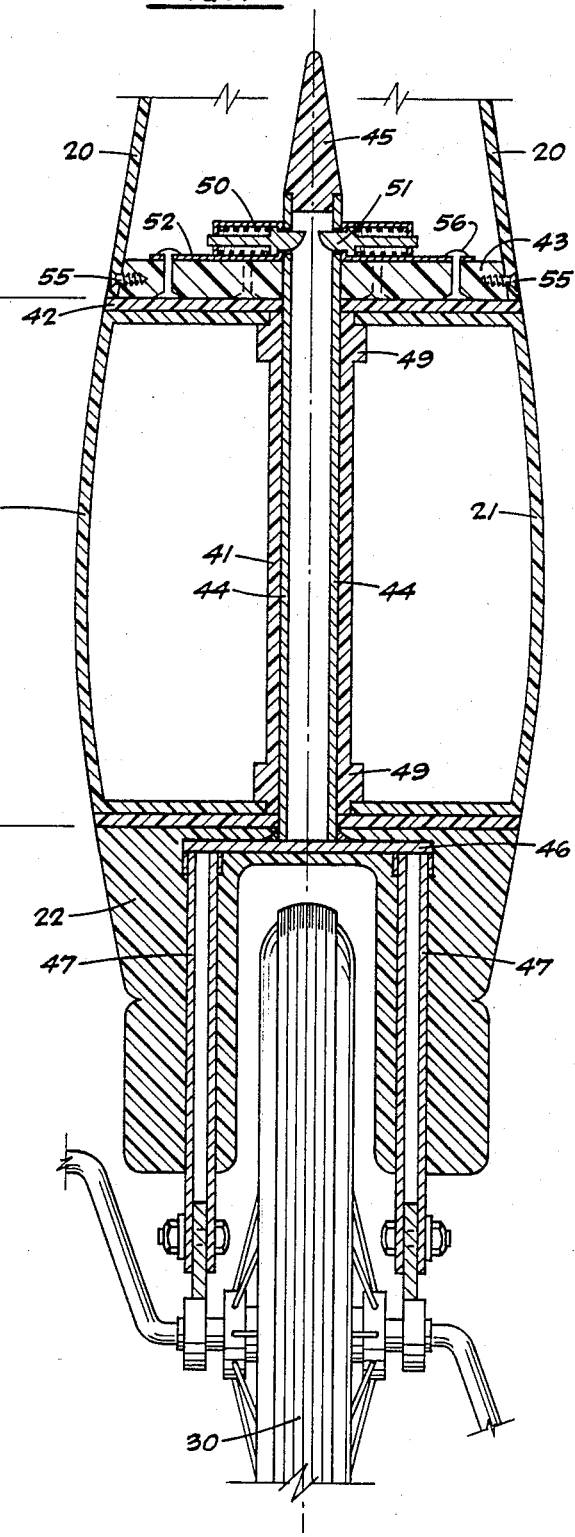
FIG. 13  FIG. 14  FIG. 15

ANIMAL FIGURE VELOCIPEDE

BACKGROUND OF THE INVENTION

1. Field of the Invention

The present invention relates to a velocipede toy for use by children. This particular velocipede resembles the shape of a horse or pony and is of a tricycle form.

The primary object of this invention is to provide a novel, sturdy pony-figured tricycle which has a head and front legs which operate as part of the steering mechanism turning independently from the body.

A further object of this invention is to provide a children's pony-figured tricycle which utilizes a unique illuminating mechanism underlying the pony's transparent eye coverings. This unique "glowing eyes" feature will cause the invention to be of greater fascination to the child and will increase nightime safety by making the invention more visible to third parties operating automobiles, bicycles, and other potentially harmful vehicles from the child's standpoint.

A further object of this invention is to provide a convenient and dependable mechanism for attaching the front legs and head sections of the velocipede to the body.

2. Description of the Related Art

Numerous pony-shaped velocipedes are known in the art. Many of them describe velocipedes having flat two-dimensional bodies including 2,527,684 to Moroney, 151,333 to Dobson and 167,780 to Sterancsak. Others are nothing more than horse-shaped bodies placed over preexisting tricycles such as U.S. Pat. Nos. 2,796,265 to Fields et al., and 2,815,219 to Martinez, and 4,746,132 to Eagan.

Other childrens pony-shaped vehicles have been designed which simulate the galloping action of horses, including U.S. Pat. Nos. 3,999,771 to Lohr, and 4,497,500 to Mercurio. Other velocipedes are disclosed in U.S. Pat. Nos. 1,270,169 to Kester, 2,006,349 to Fowler, and 2,591,804 to Gonda.

None of the inventions disclosed in any of these patent include the novel "glowing eyes" feature of the present invention, nor do they provide the simple and reliable method of connecting the front legs and head to the body member of the animal figure itself.

SUMMARY OF THE INVENTION

The present invention is directed to a three-wheeled cycle comprising a pony-shaped frame in a jumping position with front legs tucked directly under the pony's chest. The handlebars attach directly to the lateral portions of the pony's mouth and the pony has large transparent, cartoon-character-like eyes which can be illuminated by an internal mechanism. The pony's back legs rest on and are mechanically fastened above a rear axle which attaches to and through each rear wheel. The front wheel is positioned between the two front legs of the pony.

A hollow shaft is provided through the front portion of the body member of the invention. A front wheel is fixedly connected to a bracket and rod, which slides through the hollow shaft in the body so that it may rotate freely therein. The head member is provided with an opening over which two latching mechanisms are mounted. A nose cone is provided at the top of the rod, so that after it passes through the shaft in the body member, it may also pass into the opening in the lower portion of the head member. The nose cone pushes the latches apart until a pair of openings in the rod are reached into which the latches become permanently locked.

It is therefore an object of this invention to provide a simple but reliable method of attaching the front leg and head members of the velocipede to the body member so that they may freely rotate around said body member without any danger of becoming disconnected.

It is a further object of this invention to provide a safe and enjoyable childrens vehicle having a unique "glowing eyes" feature.

It is another object of this invention to provide a novel cartoon-character body style which is better suited for children than the authentic looking horse velocipedes used in prior patents without the illuminated eyes.

BRIEF DESCRIPTION OF THE DRAWINGS

FIG. 13 is a partially exploded view showing the positions of the head, rod and body members of the animal figure velocipede before final assembly.

FIG. 14 is a cross-sectional view of the entire front steering mechanism, as assembled.

FIG. 15 is a cross-sectional view of a portion of the steering mechanism within the head member.

DETAILED DESCRIPTION OF THE DRAWINGS

No attempt is made to show structural details of the invention in more detail than is necessary for a fundamental understanding of the invention, the description taken with the drawings making apparent to those skilled in the art of how the several forms of the invention may be embodied in practice.

Figure 1:
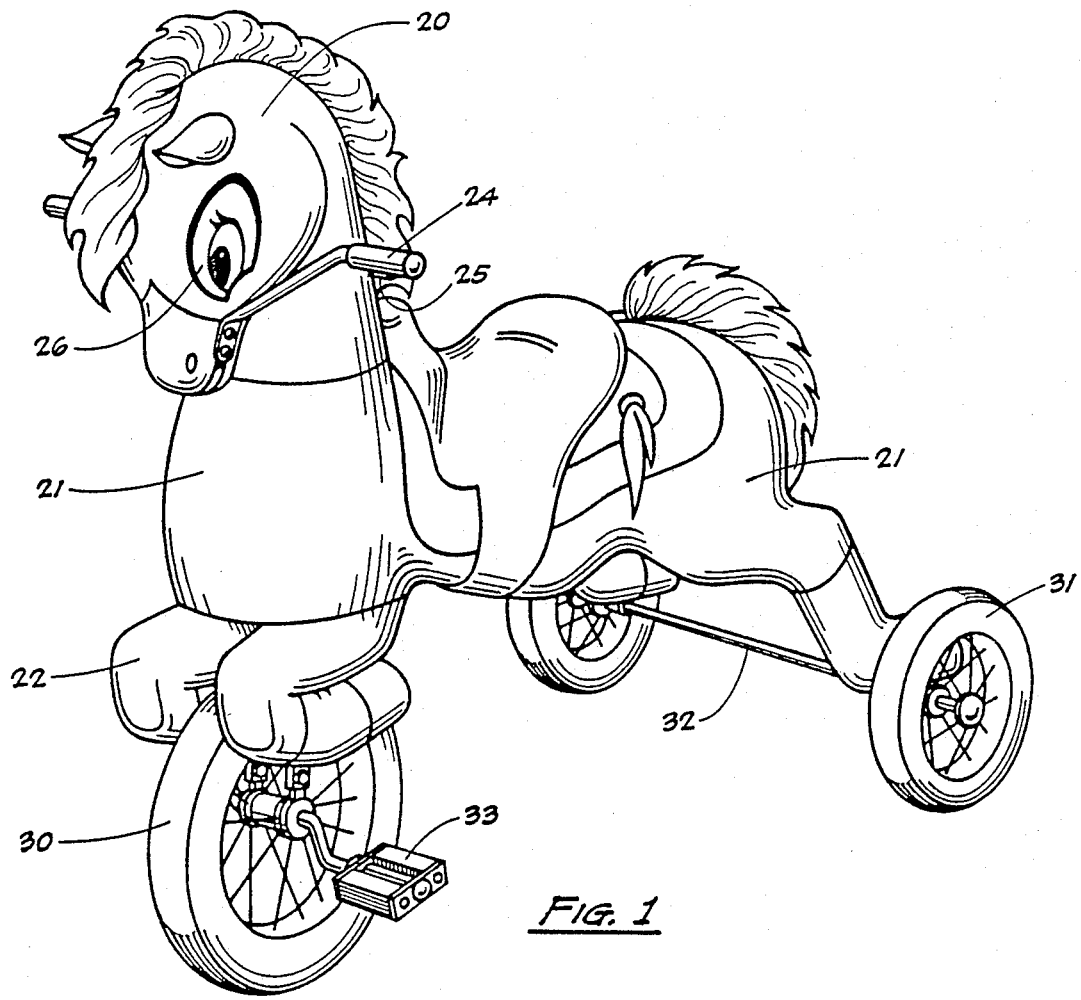
FIG. 1 is a perspective view of the animal figure velocipede embodying the present invention.

Referring to the drawings wherein like reference characters designate like or corresponding parts throughout the several views, and referring particularly to FIG. 1, it is seen that the invention comprises a three-wheeled animal figure velocipede in the shape of a pony. The body member 21 of the animal figure serves as the main support for the child. It is molded to include a saddle, blanket, tail and perhaps other equine features. A molded head 20 is also provided which includes a nose, ears, and mane among other equine features. An eye comprising a plastic lens 26 and decal 28 are provided in the head. Rein bars 24 are attached at either side of the mouth of the head. Lower body section 22 includes two bent front legs positioned over a front wheel 30 having pedals 33 attached thereto. Other equine features of the animal figure are disclosed in FIGS. 4-8.

Figure 2:
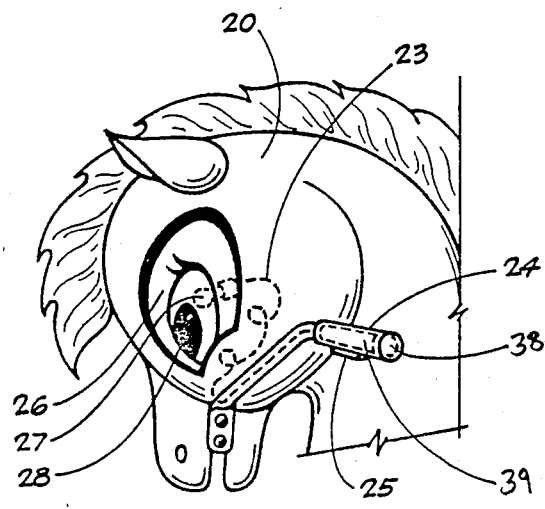
FIG. 2 is a side view of the head of the animal figure showing the internal "glowing eyes" light bulb and electrical wiring pattern.
Figure 3:
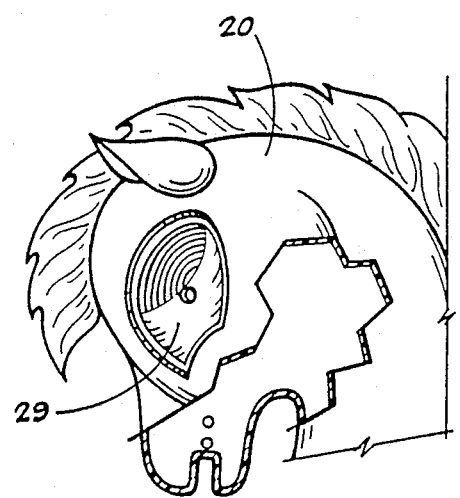
FIG. 3 is a cut-away view of the head of the animal figure showing the metal reflector in the eye and the internal structure of the head.
Figure 4:
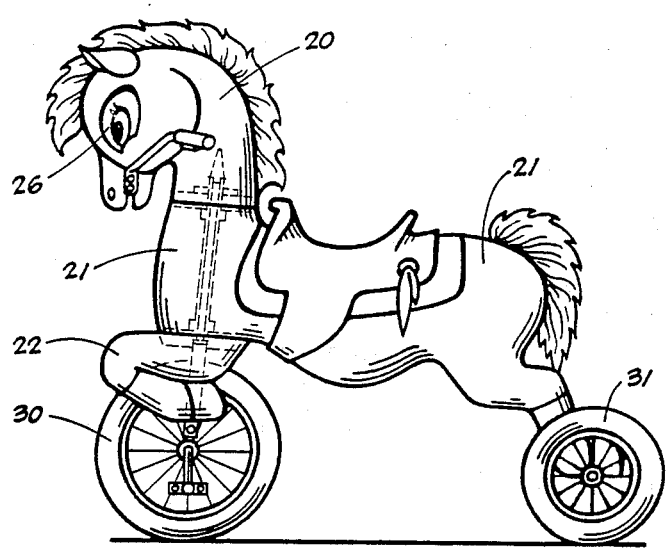
FIG. 4 is a side view of the invention herein showing the internal steering mechanism.
Figure 5:
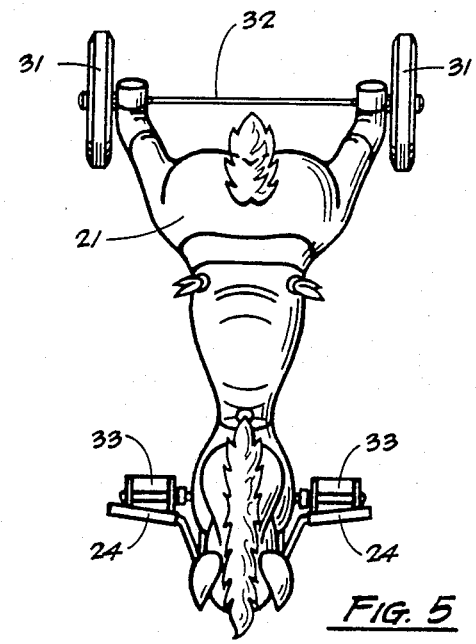
FIG. 5 is a top view of the invention herein.
Figure 6:
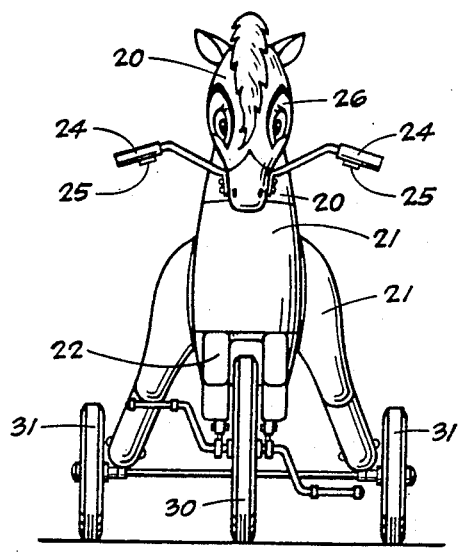
FIG. 6 is an anterior view of the invention herein.
Figure 7:
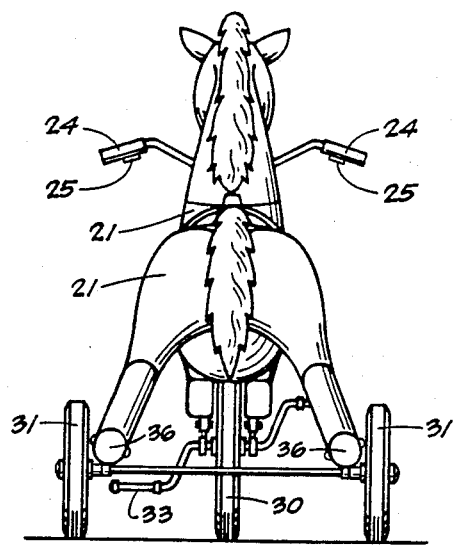
FIG. 7 is a posterior view of the invention herein.
Figure 8:
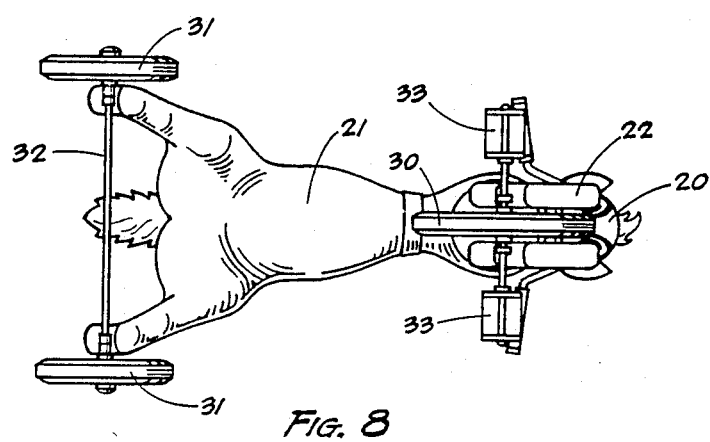
FIG. 8 is a bottom view of the invention herein.
Figure 10:
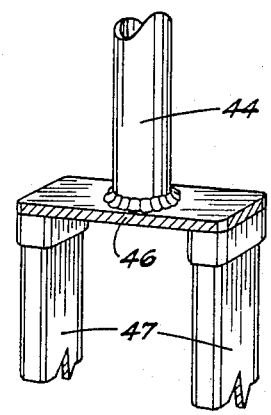
FIG. 10 is a perspective of the support bracket, crossbar, and rod which are attached above the front wheel.

A pair of illuminating mechanisms 27 are provided in the head, one for each eye. (See FIG. 2.) The illuminating mechanism 27 (in this case a single low voltage light bulb) is attached by a wire circuit 23 to a lockable switch 25 in the lower portion of the rein bar. A battery 39 may be placed within the rein bar 24 by removing cap 38, so as to provide a power source for the illumination mechanism 27.

Figure 9:
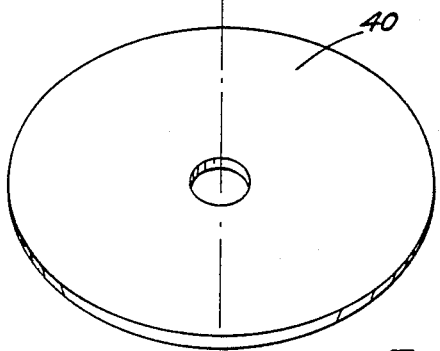
FIG. 9 is a longitudinal sectional perspective view of the steering shaft assembly in the body of the velocipede.

A hollow shaft 41 having a pair of collars 49 on either end is provided in the center of the front portion of the body 21 as shown in FIGS. 9, 13 and 14. Collar member 49 is molded around shaft 41 which may be made of metal, or a durable plastic material. Plate 42 is placed at the upper portion of the body member centered on the opening of tube 41, and plate 40 is similarly placed at the lower end of the body member (see FIG. 13).

A front wheel 30 is attached by axle means to a support bracket 47 which is welded to a rod 44 having a plastic nose cone 45 at the top. A pair of slots 48 are provided in the upper portion of rod 44 to allow interconnection of the rod to the strikers 51 of the spring locks 50 located in the head section 20.

Rod 44 is slipped into and through shaft 41 as shown in FIG. 14. The head member 20 is then placed over the nose cone 45 and rod 44. The nose cone 45 causes the strikers 51 of the spring locks 50 to push back from the rod until openings 48 reach the spring locks 50, at which point the strikers 51 snap back, holding rod 44 firmly in place. This unique attachment mechanism allows the head of the velocipede to be turned and controlled, through the rein bars, in simultaneous parallelism with the lower wheel assembly.

Figure 11:
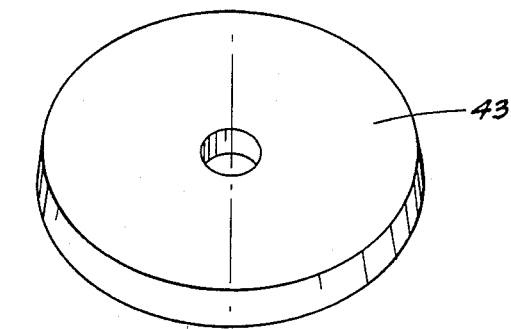
FIG. 11 is a perspective of a rear leg and wheel assembly.
Figure 11:
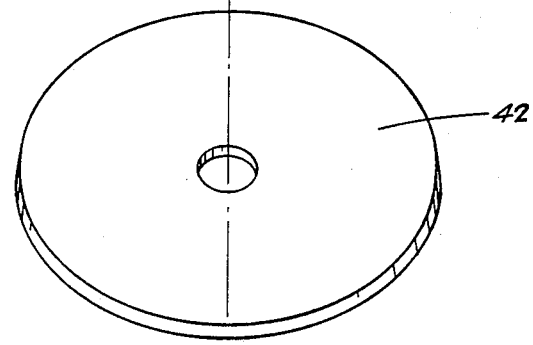
Figure 11:
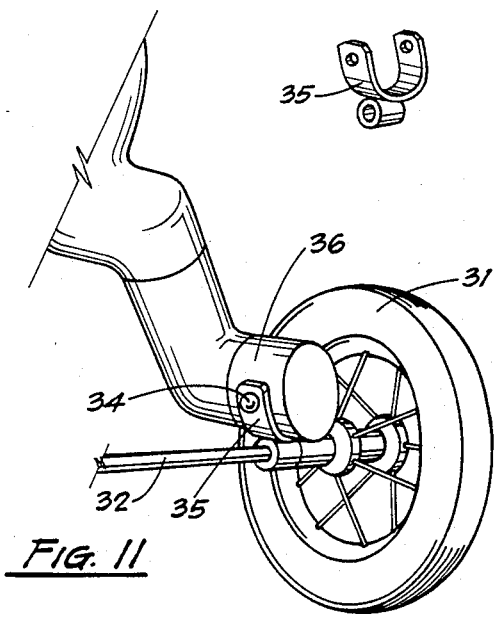
Figure 12:
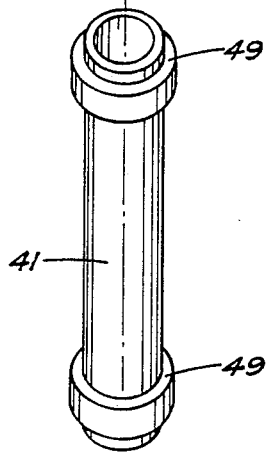
FIG. 12 is a posterior cut-away view of the hoof of the hind leg of the animal figure velocipede as it attaches to the rear axle and rear wheel.
Figure 12:
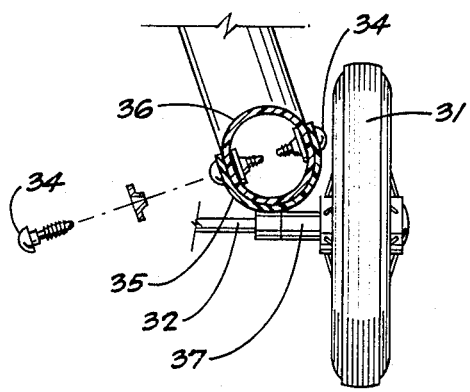

Referring to FIGS. 11 and 12, a typical rear wheel assembly includes wheel 31 attached to axle 32, having a space pipe 37 in place to prohibit the rear leg 36 from making contact with the wheel 31. The rear legs are attached by brackets 35 having attachment means 34 which connect to the rear leg 36.

DESCRIPTION OF THE PREFERRED EMBODIMENT

In the preferred embodiment, the head, body, and front leg members are comprised of a molded plastic or other similar materials such as fiberglass. The head should include certain equine features including a mane, snout, reins, mouth, ears, and transparent eyes with decal. The body sections should include other equine features including hooves, knees and a tail. The main body also should include a saddle which will serve as the child's seat, and an artistic blanket design underneath the saddle.

The rear wheels and axle are much like those of a tricycle, as is the front wheel and pedal assembly. Rod 34 should be welded to plate 46 to allow maximum stability. Spring locks 50 should also be welded or otherwise firmly attached to plate 52 which is, in turn, securely fastened to member 43 by means 56. Stability throughout the head is provided by attachment means 55 which hold the head 20 to disk means 43.

Plates 40 and 42 should be made of a slippery plastic material, but can be made of metal. Plastic has the advantage of not creating filings or shavings which may be harmful to children if swallowed.

The lenses 26 can be translucent or transparent, and should be large as indicated in FIG. 1. Artistic decals 28 may be placed over the lenses to give them an eye shape. A single or multiple illuminating mechanism 27 (in this case a light bulb) may be attached to the circuit 23 and switch 25. In the preferred embodiment, the left switch 25 controls the left eye illumination, and the right switch 25 controls the right eye illumination. In another embodiment, either switch may control a single light which illuminates both eyes.

While this invention has been described with a certain degree of particularity, it is manifest that many changes may be made in the details of construction in the arrangement of components without department from the spirit and scope of the disclosure. It is understood that the invention is not limited to the embodiment set forth herein for purpose of exemplification, but is limited only by the scope of the attached claim or claims, including the full range of equivalency to which each claim thereof is entitled.

We claim:

1. An equine animal figure velocipede comprising:
   a. an equine-shaped 3-piece body having a separate hollow head member having a bottom and a mouth, hollow abdominal member having a top, a bottom and two rear legs, and front legs member having a top;
   b. a front wheel with pedal assembly attached under the legs member;
   c. a pair of rear wheels connected by a single axle, each wheel attached by means connecting it below one of the two rear legs of the equine-shaped abdominal member;
   d. a first circular plate means having a round central hole attached to the top of the abdominal member immediately below the head member;
   e. a second circular plate means having a round central hole attached to the bottom of the abdominal member immediately above the front legs member;
   f. a hollow vertical shaft centrally disposed through said abdominal member between the holes in the first plate means and second plate means;
   g. a rod means having a top fixedly attached to the top of the front legs member, said rod having an outer diameter slightly less than an inside diameter of the shaft through the abdominal member whereby said rod may be rotatably disposed through said shaft, said rod having a pair of squared openings opposite each other near the top of the rod;
   h. a nose cone attached to the top of said rod;
   i. a third cylindrical plate means having a round central hole attached to the bottom of the head member, said hole having the same diameter as the shaft in the abdominal member;
   j. a pair of spring locks having a pair of strikers oppositely displaced inside the head member above the hole in the third plate means so that the strikers of said spring locks are pushed back as the nose cone and shaft are inserted through said hole until the squared openings near the top of the rod reach the strikers at which point the spring locks snap the strikers through said openings to fixedly hold said rod in place;
   whereby said head member and said front legs member are connected through said abdominal member so that said head and front legs members may rotate freely in parallelism around the shaft.

2. The equine animal figure velocipede described in claim 1 above wherein a pair of transparent eye lenses are provided on opposite sides of the head member, behind which an illumination means is provided.

3. The equine animal figure velocipede described in claim 2 above wherein a pair of rein bars having ends and undersides are connected to each side of the mouth of the head member, each such rein bar having a switch located on the underside at the end of the rein bar such that each switch may be easily reached by a rider of the velocipede which switches each activate the illuminating means.

4. The equine animal figure velocipede described in claim 1 above wherein each rear wheel attachment means is comprised of a U-shaped means attached to one of said rear legs having an axle shaft at the bottom thereof which fits over a rear axle, and a separate space pipe placed over said axle between said axle shaft and the corresponding rear wheel in order to prevent the rear leg from making contact with the rear wheel.

* * * * *